United States Patent [19]

Kress et al.

[11] Patent Number: 5,098,251
[45] Date of Patent: Mar. 24, 1992

[54] LADLE CARRIER WITH LATERALLY ADJUSTABLE CRADLE

[75] Inventors: Edward S. Kress; Dennis H. Thomas; William L. LaBerdia, all of Brimfield, Ill.

[73] Assignee: Kress Corporation, Brimfield, Ill.

[21] Appl. No.: 599,634

[22] Filed: Oct. 18, 1990

[51] Int. Cl.$^5$ .............................................. B65G 65/04
[52] U.S. Cl. ...................................... 414/458; 414/546
[58] Field of Search .............................. 414/419–421, 414/458–460, 498, 546

[56] References Cited

U.S. PATENT DOCUMENTS

| | | | |
|---|---|---|---|
| 3,330,429 | 7/1967 | Kress | 414/421 |
| 3,825,135 | 7/1974 | Kress | 414/420 |
| 3,861,535 | 1/1975 | Huxley et al. | 414/460 X |
| 3,897,881 | 8/1975 | Brock | 414/459 X |
| 4,063,658 | 12/1977 | Kress et al. | 414/421 |
| 4,122,961 | 10/1978 | Kress | 414/420 |
| 4,168,930 | 9/1979 | Brock | 414/421 |
| 4,624,618 | 11/1986 | LaBerdia et al. | 414/421 X |
| 4,729,710 | 3/1988 | Kress et al. | 414/421 |

Primary Examiner—David A. Bucci
Attorney, Agent, or Firm—Leydig, Voit & Mayer

[57] ABSTRACT

A carrier for lifting and transporting a heavy ladle including a tractor and trailer having a longitudinal center line and a U-shaped frame and a rearwardly opening rigid cradle pivotally mounted on the frame for embracing the ladle and with notches for engaging and lifting the ladle by its trunnions and provided with a hydraulic lift cylinder for vertically pivoting the cradle with respect to the trailer frame wherein the cradle pivot mountings include hydraulic shift actuators aligned parallel with respect to the cradle front cross frame to shift the entire cradle laterally with respect to the trailer center line and the hydraulic lift cylinders are pivotally mounted to the trailer frame and cradle arms with ball connections to permit the limited lateral tilting of the lift cylinders.

5 Claims, 3 Drawing Sheets

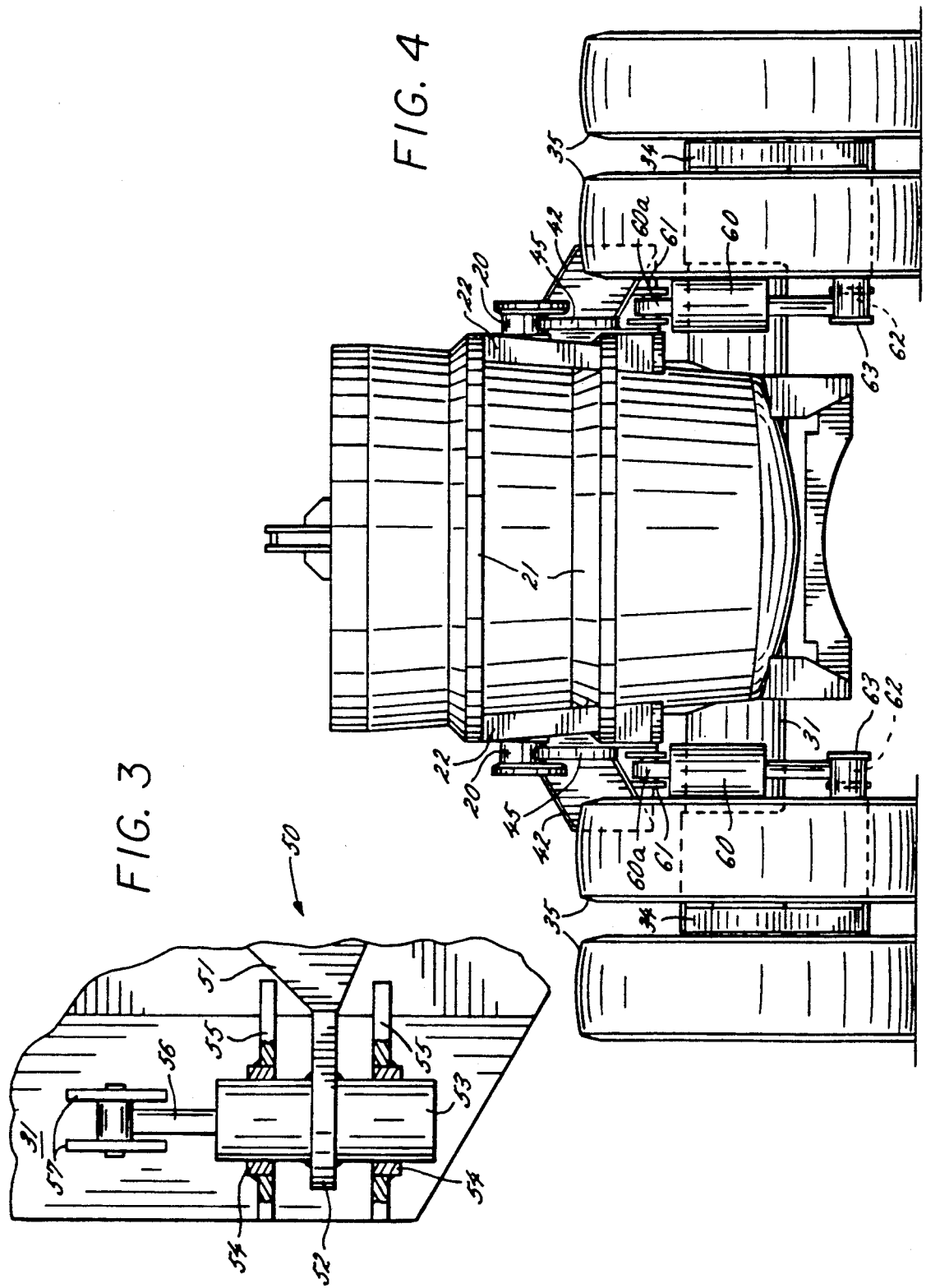

LADLE CARRIER WITH LATERALLY ADJUSTABLE CRADLE

FIELD OF THE INVENTION

The present invention relates generally to a heavy duty vehicle and more particularly concerns a carrier trailer for picking up and transporting heavy ladles or slag pots such as the kind used in the steel making industry.

BACKGROUND OF THE INVENTION

In U.S. Pat. No. 4,729,710, there is disclosed a heavy duty carrier intended to pickup and transport large ladles or slag pots of the kind used in foundries, steel mills, and other metal and slag generating industries and which weigh, when loaded, on the order of 200 to 400 tons. Generally speaking, the carrier disclosed in the above patent includes a trailer with a pair of heavy trailing arms on which the load supporting wheels are mounted and a generally U-shaped cradle pivotally mounted on the trailer arms for embracing the ladle or pot and supporting it through large laterally spaced hooks suspended from the cradle arms to engage the ladle trunnions. The carrier disclosed in the above patent includes a laterally shiftable cradle which provides advantages over carriers of the type disclosed in U.S. Pat. Nos. 3,330,429, 3,825,135, 4,063,658 and 4,122,961 since these carriers contain non-laterally shiftable cradles thus requiring very accurate maneuvering of the large heavy trailer in picking up the ladle so as to avoid the ladle being unnecessarily bumped or jarred resulting in potential damage to the ladle.

The laterally shiftable carrier disclosed in U.S Pat. No. 4,729,710 includes a pair of rearwardly projecting, articulated cradle side members which include rear extensions pivotally connected to rigid front legs by substantially vertical hinges. Hydraulic shift cylinders are provided to laterally shift the cradle side members by pivoting of the hinged side member extensions. Due to the extreme weight of the loaded ladle, the hinged cradle side members experience unusually large amounts of stress when supporting a loaded ladle and this may produce functional difficulties during the operation of such a carrier. Additionally, these lateral shifting arrangements are rather complicated and therefore expensive to build initially and to service and maintain in use.

OBJECTS AND SUMMARY OF THE INVENTION

It is the primary aim of the present invention to provide a heavy duty carrier for slag pots, molten metal ladles, and the like with a supporting cradle adapted to engage trunnions on the ladle that can be moved laterally relative to the trailer in order to facilitate proper alignment with the ladle for pickup and to laterally adjust the ladle position relative to the trailer when the ladle is being set down. A further object of the invention is to provide a heavy ladle supporting cradle such that the entire rigid cradle structure is laterally shiftable, as opposed to having hingedly articulated or laterally shiftable partial cradle side members, the former thus resulting in an advantageous force distribution on the cradle during lifting and transporting of the ladle, as compared to the latter.

Yet another object of the invention is to provide a stabilizer for limiting fore and aft swinging of the ladle about its trunnion supports during transport.

According to the present invention, a carrier for lifting and transporting a heavy ladle is provided including a tractor and a trailer having a U-shaped frame and a rearwardly opening cradle pivotally mounted on the frame for embracing the ladle and adapted for engaging and lifting the ladle by its trunnions. A hydraulic lift cylinder is provided on each side of the trailer for vertically pivoting the cradle with respect to the trailer frame. The entire cradle structure is connected to the trailer frame by a mounting arrangement in which a hydraulic actuator can shift the cradle laterally with respect to the trailer center line. The ends of the hydraulic lift cylinders (on each side of the trailer) are also pivotally connected to the trailer side members and the cradle arms with ball connections to permit limited lateral tilting thereof. In the preferred embodiment, the carrier also includes a stabilizer attached to the trailer frame to limit fore and aft swinging of the ladle during transport.

These and other features and advantages of the invention will be more readily apparent upon reading the following description of a preferred exemplified embodiment of the invention and upon references to the accompanying drawings wherein:

BRIEF DESCRIPTION OF THE DRAWINGS

FIG. 3 is an enlarged, fragmentary top plan view of the cradle pivot mounting arrangement; and FIG. 4 is a rear elevation of the carrier of FIG. 1.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
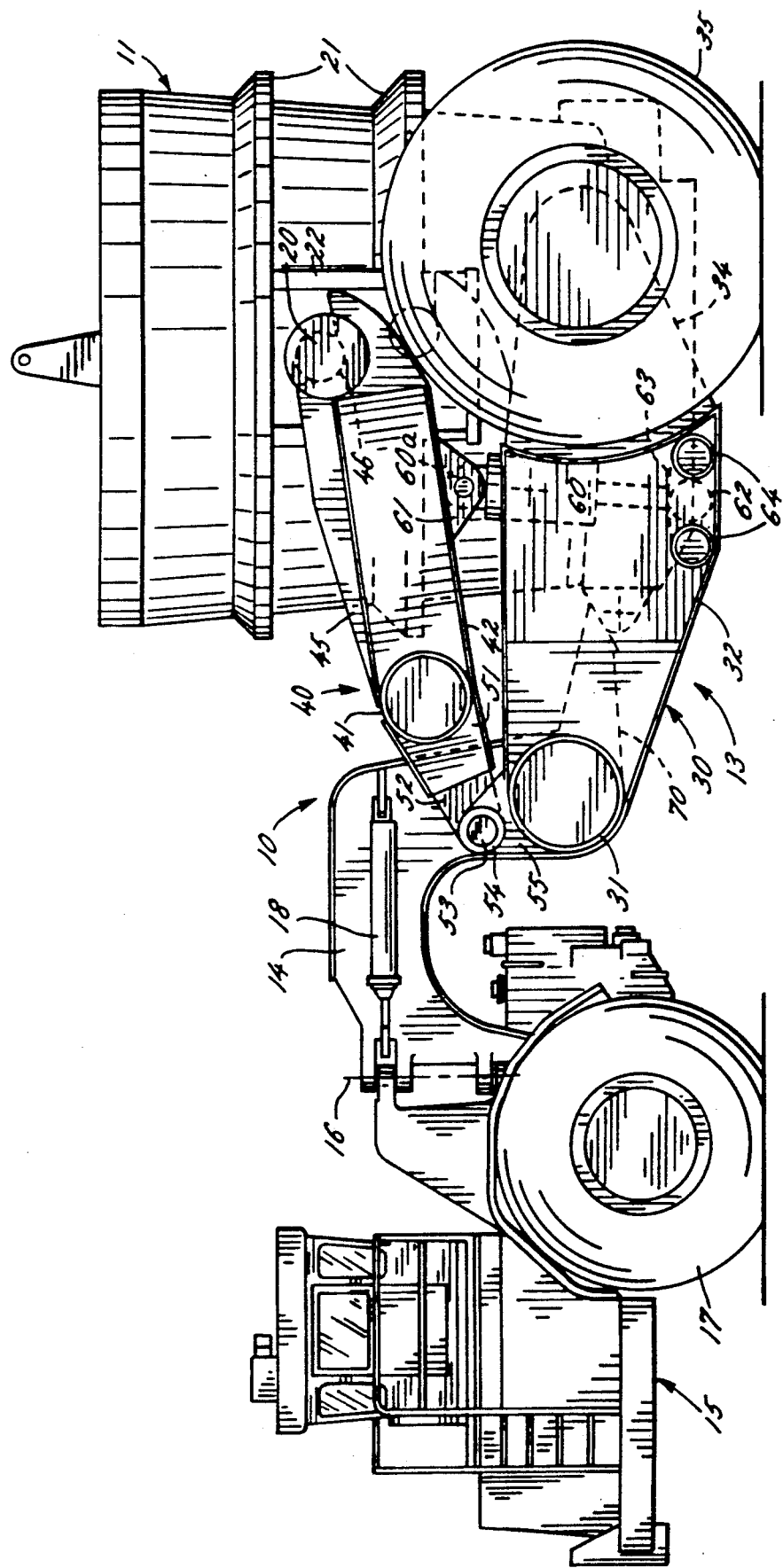
FIG. 1 is a side elevation of the ladle carrier of the present invention, with solid lines showing the ladle and the cradle lift arms raised to the transport position and dashed lines showing the cradle arm tip and the ladle trunnion in the lowered position.
Figure 2:
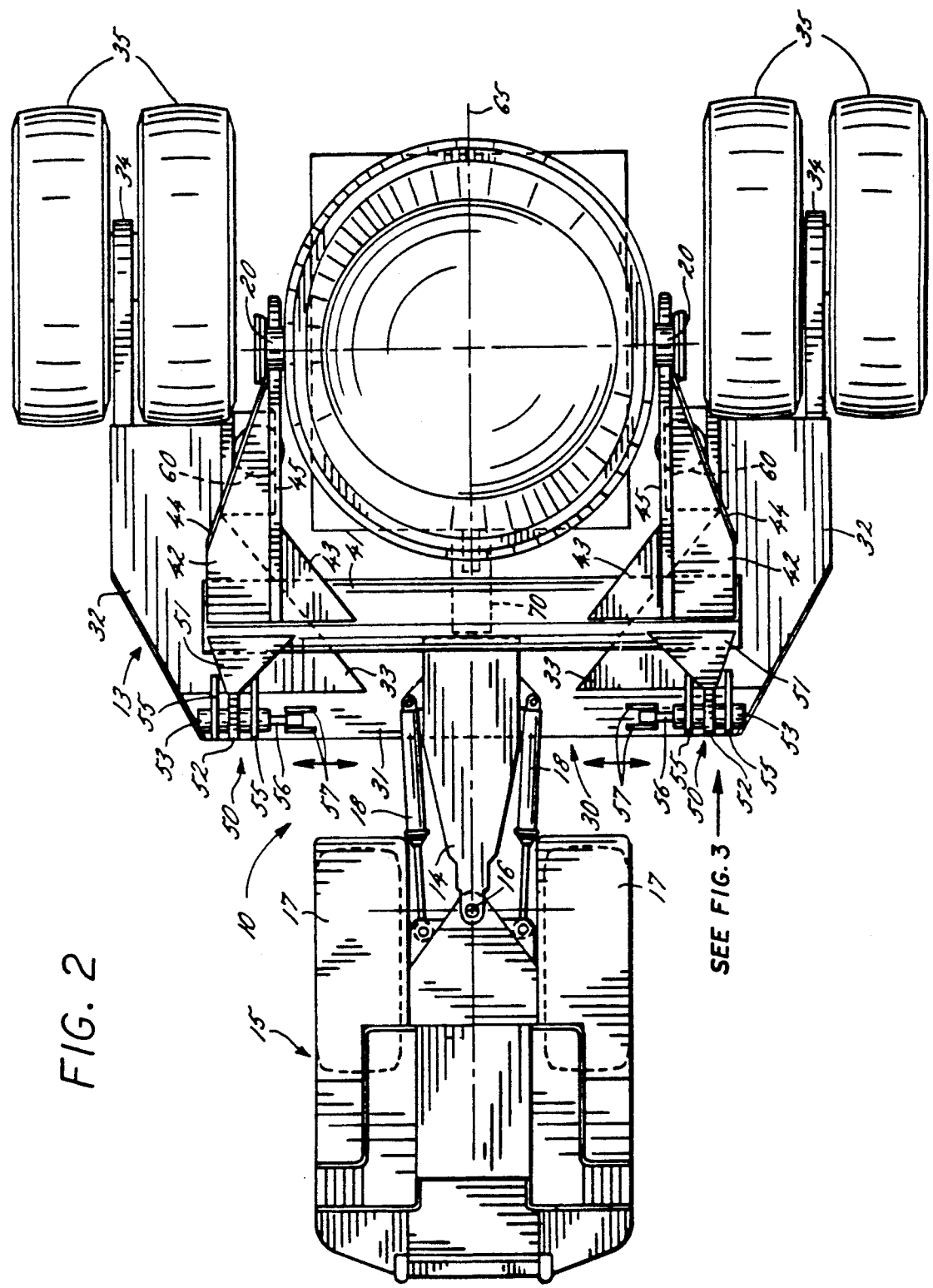
FIG. 2 is a top plan view of the carrier of FIG. 1.

Turning now to the drawings, there is shown in FIG. 1 a heavy duty carrier 10 for lifting and transporting a ladle 11 or the like. The illustrated carrier 10 includes a trailer 13 with a forwardly projecting gooseneck-like member 14 connected to a suitable prime mover such as a two-wheeled tractor 15. The trailer 13 and tractor 15 are pivoted about a vertical axis 16 to give extremely good maneuverability. The gooseneck-like tongue 14 provides sufficient clearance over the tractor wheels 17 so that the tractor can be turned substantially at right angles to the trailer and the carrier can turn substantially within its own length.

The ladle 11 (slag pot or other container) is typically cup-shaped and is formed with side projections 20 in the form of trunnions for lifting and dumping the ladle 11. Typically the ladle 11 may include one or more circumferential reinforcing flanges 21 and reinforcing plates 22 in the area of the trunnions 20.

The trailer 13 includes a generally U-shaped main frame 30 including a heavy tubular cross beam 31 integral with or otherwise securely connected to the gooseneck 14 and a pair of rearwardly projecting side members 32 rigidly joined to the cross beam 31. In the illustrated embodiment, the side members 32 are formed with a heavy box-like construction and are reinforced at their connection to the cross beam 31 with triangular extension plates 33. Additionally, the ends of the cross beam 31 and the front portion of the side members 32 taper outward from the trailer center line. The rear ends 34 of the side members 32 are formed with narrower widths for supporting axle means (not shown) for journaling a plurality of trailer wheels 35. In the preferred embodiment, dual wheels 35 are provided at the rear end 34 of each side member 32. It will be understood that the wheels 35 are of the heavy duty type and each wheel may have a load bearing capacity of 100 tons or more.

For lifting and carrying the ladle 11, a generally rigid U-shaped cradle 40 is provided which is dimensioned to embrace the ladle on three sides. The cradle 40 includes a heavy tubular front cross frame 41 and a pair of rearwardly projecting generally box-like arms 42 rigidly joined to the cross frame 41 and reinforced there with triangular plates 43. Preferably, the rear sections 44 of the cradle arms 42 are tapered inward to prevent the arms 42 from contacting the rear wheels 35. The inner plates 45 of the cradle arms extend above and rearwardly beyond the tapered rear sections 44 and each plate contains a receiving notch 46 in the rear portion of the plate adapted to engage the ladle trunnion 20 for lifting and supporting the ladle 11.

The cradle 40 is pivotally connected to the trailer cross beam 31 through a mounting arrangement 50. To pivot the cradle 40 upward and thus raise the ladle 11, a pair of heavy duty lift cylinders 60 are provided. In the preferred embodiment, the upper end 60a of each cylinder 60 is pivotally connected through a cross pin and ball connection to a pair of mounting lugs 61 rigidly secured to the bottom of the tapered rear section 44 of one of the cradle arms 42. The lower or piston rod end of each cylinder 60 is pivotally connected through a ball connection 62 to a mounting bracket 63 rigidly attached to one of the trailer side members 32 through tubular mounting frames 64. It will be understood that as the hydraulic cylinders 60 are extended the cradle 40 is pivoted upward to lift the ladle 11 and as the cylinders are retracted the ladle is lowered. The dashed lines of FIG. 1 show the ladle trunnion 20 and the rear end of the inner plate 45 of the cradle arm, including the receiving notch 46, in the lowered position.

In accordance with the present invention, means are provided for laterally shifting the cradle 40 with respect to the longitudinal center line 65 of the trailer 13. To this end, the cradle cross frame 41 is pivotally connected to the trailer cross beam 31 through a laterally shifting mounting arrangement 50. As shown in the FIG. 3 enlargement, a generally pyramid-shaped mounting frame 51 is rigidly secured to each end of the cradle cross frame 41. Each mounting frame 51 terminates in a longitudinally extending connection plate 52 which is rigidly attached to the cylinder 53 of a hydraulic shift actuator such that the cylinder 53 is aligned parallel with the cradle cross frame 41. In the illustrated embodiment, each cylinder 53 is mounted on bushings 54 which are contained in mounting plates 55 rigidly attached to the top of the trailer cross frame 31 such that the bushings 54 permit axial movement of the cylinders 53 during lateral shifting and coaxial rotation of cylinders with respect to the piston rods 56 when the cradle 40 is being pivoted upward. The piston rod 56 of each hydraulic shift actuator is anchored to a bifurcated mounting bracket 57 which is rigidly attached to the trailer cross frame 31.

To laterally shift the cradle 40, the cylinders 53 are alternately extended and retracted with respect to the fixed piston rods 56 resulting in the axial movement of each cylinder and the corresponding shifting of the cradle 40 laterally with respect to the trailer center line 65. This lateral shifting is limited by the confined movement of the connection plate 52 between the mounting plates 55. During lateral shifting, it should be noted that the ball connections at the upper and lower ends of the lift cylinders 60 permit the cylinders to tilt and permit the lateral movement of the cradle 40.

It will be appreciated that by laterally shifting the cradle 40, the receiving notches 46 on the inner plates 45 of the cradle arms 42 can easily be brought into proper alignment with the trunnions 20 as the trailer 13 is backed into position around the ladle 11. Accordingly, maneuvering the tractor 15 and trailer 13 is less critical and also the chances of bumping, jarring, and damaging the ladle are consequently lessened. Likewise, when the cradle is to be set down it can be accurately located laterally with respect to the companion ladle stand or other designated support by appropriately energizing the shift actuators. Again, the lateral shifting arrangement of the present invention makes it substantially easier to accurately spot the ladle 11 without requiring great driver skill or repeated maneuvering the tractor 15 and trailer 13.

It is also desirable to prevent the ladle 11 from swinging during transport as this causes undesirable weight shifting of heavy ladle loads and consequent surging motion of the tractor-trailer combination. Accordingly, in the illustrated embodiment, a ladle stabilizer leg 70 is provided which is rigidly secured to the trailer cross beam 31 such that the ladle stabilizer leg 70 contacts the lower portion of the ladle during transport to thereby limit fore and aft swinging of the ladle.

From the foregoing, it will be appreciated that the present invention provides a novel heavy duty ladle carrier 10 having a rigid ladle support cradle 40 that may be easily shifted laterally to align the cradle receiving notches 46 with the ladle trunnions 20 for pickup or for aligning the ladle 11 over a support stand or the like for accurate set down. Also included in the carrier is a cradle stabilizer leg 70 to limit swinging of the ladle during transport.

We claim as our invention:

1. A carrier for lifting and transporting a heavy ladle or slag pot having lateral trunnions, comprising in combination, a self-propelled tractor, a wheeled trailer having a longitudinal center line and a generally U-shaped frame with a forward frame portion, a pair of rearwardly projecting trailer side members, and a forwardly projecting integral tongue pivotally connected to the tractor, a generally rearwardly opening rigid cradle including rearwardly projecting arms connected by a forward cross frame to first pivot means having a substantially horizontal axis adjacent the forward portion of the trailer frame for connecting said cradle and said trailer frame, and said cradle adapted to embrace the ladle and engage the trunnions for lifting the ladle, a hydraulic lift actuator interconnected by second pivot means to a rearwardly extending arm of the cradle and to a side member for the trailer frame for pivotally swinging said cradle about said substantially horizontal axis and for raising and lowering the cradle with respect to the rearwardly projecting trailer side members, and shift actuator means disposed substantially in alignment with said first pivot means for shifting the cradle along said substantially horizontal axis and laterally with respect to the trailer center line.

2. A carrier as defined in claim 1 wherein said shift actuator means includes a hydraulic actuator comprising a piston and cylinder mounted parallel with respect to the forward cross frame of the cradle and wherein one of said piston and cylinder of said hydraulic actuator is attached to the forward cross frame of the cradle and the other of said piston and cylinder is connected to the forward frame portion of the trailer.

3. A carrier as defined in claim 2 wherein said hydraulic shift actuator is attached to the forward frame portion of the trailor by mounting means such that said piston of the actuator is rigidly secured to the forward frame portion and said cylinder of the actuator is mounted on bushings on the forward frame portion for permitting limited axial sliding of the cylinder when the piston is extended and retracted with respect thereto and also allowing axial rotation of the cylinder when the cradle is pivoted about said substantially horizontal axis.

4. A carrier as defined in claim 1 wherein said hydraulic lift actuator comprises a piston and cylinder and said second pivot means include ball-like connections at the ends of said piston and cylinder for permitting limited lateral tilting of said hydraulic lift actuator.

5. A carrier as defined in claim 1 including abutment means engageable with the ladle for limiting fore and aft swinging of the ladle about its trunnions during transport.

* * * * *